United States Patent
Nassimi (10) Patent No.: US 7,869,823 B2
(45) Date of Patent: Jan. 11, 2011

(54) WIREFREE INTERCOM HAVING ERROR FREE TRANSMISSION SYSTEM AND PROCESS

(75) Inventor: Shary Nassimi, Malibu, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1123 days.

(21) Appl. No.: 11/381,004

(22) Filed: May 1, 2006

(65) Prior Publication Data
US 2007/0254591 A1    Nov. 1, 2007

(51) Int. Cl.
| H04M 1/00 | (2006.01) |
| H04B 3/36 | (2006.01) |
| H04B 7/14 | (2006.01) |
| H04B 1/00 | (2006.01) |
| H04B 15/00 | (2006.01) |
| H04W 36/00 | (2009.01) |

(52) U.S. Cl. .................. 455/550.1; 455/8; 455/63.1; 455/74.1; 455/436; 379/159

(58) Field of Classification Search ............... 455/63.3, 455/74.1, 550.1, 63.1, 436; 379/159
See application file for complete search history.

(56) References Cited

U.S. PATENT DOCUMENTS

| 5,034,882 | A | 7/1991 | Eisenhard et al. |
| 5,315,639 | A | 5/1994 | Lassers |
| 5,479,650 | A * | 12/1995 | Archibald et al. ............... 714/4 |
| 5,487,181 | A | 1/1996 | Dailey et al. |
| 5,519,762 | A | 5/1996 | Bartlett |
| 5,999,105 | A | 12/1999 | Gordon |
| 6,192,230 | B1 | 2/2001 | van Bokhorst et al. |
| 6,480,476 | B1 | 11/2002 | Willars |
| 7,103,392 | B2 * | 9/2006 | Fletcher et al. ........... 455/569.1 |
| 7,148,787 | B2 | 12/2006 | Lucy et al. |
| 7,301,950 | B1 | 11/2007 | Cheong et al. |
| 7,310,670 | B1 | 12/2007 | Walbeck et al. |
| 7,352,693 | B2 * | 4/2008 | Seid et al. .................... 370/216 |
| 7,505,795 | B1 | 3/2009 | Lim et al. |
| 2002/0119778 | A1 * | 8/2002 | Baker et al. ................. 455/436 |
| 2003/0012217 | A1 * | 1/2003 | Andersson et al. .......... 370/437 |
| 2003/0207694 | A1 * | 11/2003 | Legare et al. ............... 455/511 |
| 2004/0100937 | A1 * | 5/2004 | Chen .......................... 370/345 |
| 2004/0124970 | A1 * | 7/2004 | Fischer et al. .............. 340/10.1 |
| 2004/0237020 | A1 * | 11/2004 | Eiji ............................ 714/758 |
| 2005/0070275 | A1 | 3/2005 | Jeyaseelan et al. |
| 2005/0124313 | A1 | 6/2005 | Simpson et al. |
| 2005/0128988 | A1 | 6/2005 | Simpson et al. |
| 2005/0277392 | A1 | 12/2005 | Forstl et al. |
| 2006/0014537 | A1 | 1/2006 | Arai et al. |

(Continued)

Primary Examiner—Matthew D Anderson
Assistant Examiner—Bobbak Safaipour
(74) Attorney, Agent, or Firm—Fitch Even Tabin & Flannery (57) ABSTRACT

A wireless intercom having a microcontroller that is programmed to place the intercom into a power saving sleep mode unless actively receiving or transmitting signals. The microcontroller of the intercom is interconnected to a transceiver for sending and receiving digital data packets, and to a codec for converting the digital packets to analog sound signals, and vice versa. The intercom receives digital transmission of data over a first channel and then corrects any errors in the digital data using a retransmission of the digital data over a second channel that is sufficiently spaced apart from the first channel to avoid the possibility of interference affecting both the first and second channels.

20 Claims, 9 Drawing Sheets

U.S. PATENT DOCUMENTS

| | | |
|---|---|---|
| 2006/0140166 A1 | 6/2006 | Albulet |
| 2006/0240798 A1 | 10/2006 | Jarosinski et al. |
| 2006/0240826 A1* | 10/2006 | Shinozaki ................... 455/436 |
| 2006/0270382 A1 | 11/2006 | Lappetelainen et al. |
| 2007/0087780 A1 | 4/2007 | Nassimi |
| 2007/0135179 A1 | 6/2007 | Hardman et al. |
| 2007/0213028 A1 | 9/2007 | Shohara et al. |
| 2007/0254680 A1* | 11/2007 | Nassimi ...................... 455/462 |
| 2007/0254687 A1* | 11/2007 | Nassimi ................... 455/550.1 |
| 2008/0265023 A1 | 10/2008 | Nassimi |
| 2009/0103803 A1* | 4/2009 | Kumar et al. ............... 382/166 |
| 2010/0077251 A1* | 3/2010 | Liu et al. ....................... 714/4 |

* cited by examiner

WIREFREE INTERCOM HAVING ERROR FREE TRANSMISSION SYSTEM AND PROCESS

BACKGROUND OF THE INVENTION

1. Field of Invention

The present invention relates to intercoms and, more specifically, to a wirefree intercom having improved transmission quality.

2. Description of Prior Art

Conventional intercoms are powered by the wall outlet and transmit the voice of the speaker over the wires installed throughout the home. These intercoms use power line modulation techniques and have limited ranges due to the need for physical attachment to the power lines in the wall, as well as when the possibility of phase changes in the power connection that may interfere with the signal. In addition, the sound quality is often limited in such systems, and when there is a motor (such a hair dryer or vacuum cleaner) also in operation on the circuit, the signal is often distorted or destroyed.

Wireless intercoms use a radio signal and, like conventional intercoms, are powered by a wall outlet. These devices usually employ Family Radio Service (FRS) radio technology and have decent range capabilities. However, such devices do not provide security when multiple devices are employed in a dwelling. For example, if there are five units in a home and all are set to the same security number, each unit allows for reception of a conversation occurring between any other two units. In a business environment, this loss of security is not desirable. Additionally, such devices consume too much power and are thus not feasibly implemented without a direct power connection to a wall outlet. Some wireless intercoms use both wall power and batteries. In addition to limitation described above with respect to wireless intercoms, the batteries in such systems will only last about a day or two when the device is left on.

SUMMARY OF THE INVENTION

It is a principal object and advantage of the present invention to provide a wirefree intercom system that avoids the need for line power.

It is another object and advantage of the present invention to provide a wirefree intercom system that has low power consumption.

It is an additional object and advantage of the present invention to provide a wirefree intercom system having an unlimited number of units.

It is a further object and advantage of the present invention to provide a wirefree intercom system that provides secure conversation.

It is another object and advantage of the present invention to provide a wirefree intercom that is not affected by line noise.

It is an additional object and advantage of the present invention to provide a wirefree intercom system that has a long range.

It is a further object and advantage of the present invention to provide a wirefree intercom system that has clear sound qualities.

Other objects and advantages of the present invention will in part be obvious, and in part appear hereinafter.

In accordance with the foregoing objects and advantages, the present invention comprises wirefree intercom having circuitry and control processing that significantly reduces power consumption. More particularly, the intercom comprises a base unit and an antenna attached thereto for communicating with any number of other based units. Each base unit comprises a microcontroller, transceiver, codec, and speaker for receiving digital signal packets and converting into audible sounds and a microphone associated with the codec, microcontroller, and transceiver for converting sounds into digital data packets and transmitting to a remote intercom. The power reduction circuitry comprises the use of a wake timer and a talk timer that limit the amount of time that the associated circuitry remains operative. More particularly, the wake timer places the microcontroller in a timed, periodic sleep mode. After the expiration of the wake timer, the microcontroller activates the transceiver and checks for the presence of appropriate digital signals. If no signals are received, the intercom returns to sleep mode, thereby reducing power consumption. The intercom is programmed to receive digital transmission of data over a first channel and then corrects any errors in the digital data using a retransmission of the digital data over a second channel that is sufficiently spaced apart from the first channel to avoid the possibility of interference affecting both the first and second channels

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1A:
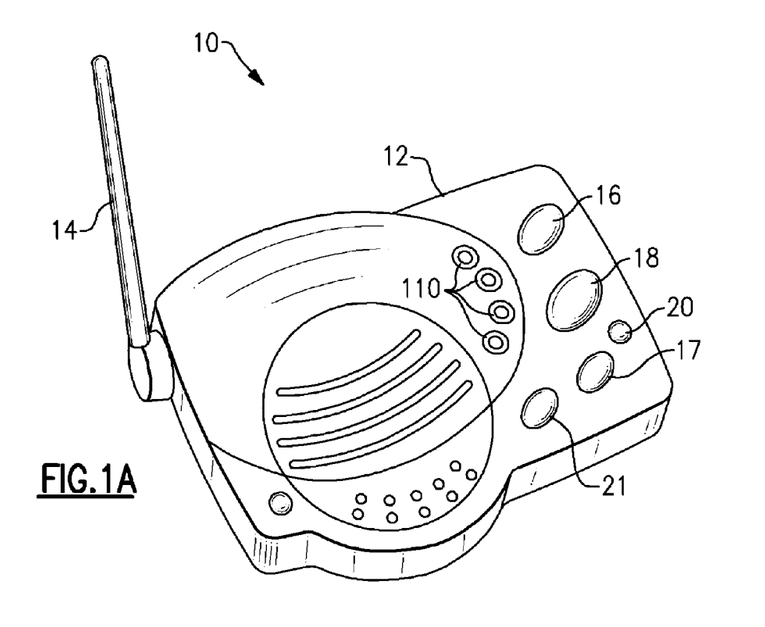
FIG. 1A is a perspective view of a wirefree intercom base unit according to the present invention.
Figure 1B:
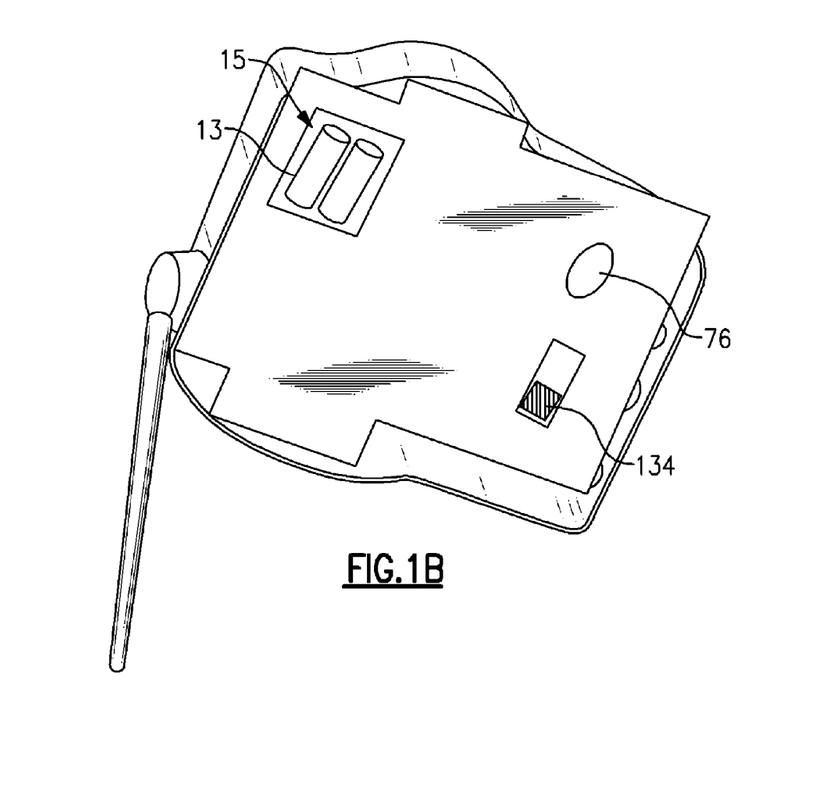
FIG. 1B is a perspective view of a wirefree intercom base unit according to the present invention.

Referring now to the drawings, wherein like numerals refer to like parts throughout, there is seen in FIGS. 1 A and 1B a wirefree intercom 10 according to the present invention. Intercom 10 comprises a base unit 12 and an antenna 14 attached thereto. Base unit 12 houses the circuitry for providing wireless intercom capabilities, without the need for line power or excessive battery power usage, as will be described hereinafter. Base unit 12 further houses a power source, such as a conventional battery 13, which may be received in a compartment 15 formed into the bottom of base unit 12. Base unit 12 may further include a channel select button 16, which allows a user to cycle through the preselected channels or select all of the preselected channels for transmission and reception. Intercom 10 may further comprise any number of illuminating regions 17 and 110, such as LEDs, for reflecting the current operating mode of base unit 12, such as "sleep" or active, for indicating whether the power "on," etc. Intercom 10 further comprises a talk button 18 for transmitting from intercom 10, a microphone 20 for receiving sounds to be transmitted, and a volume button 21 to control the volume of sounds played back on intercom 10.

Figure 2:
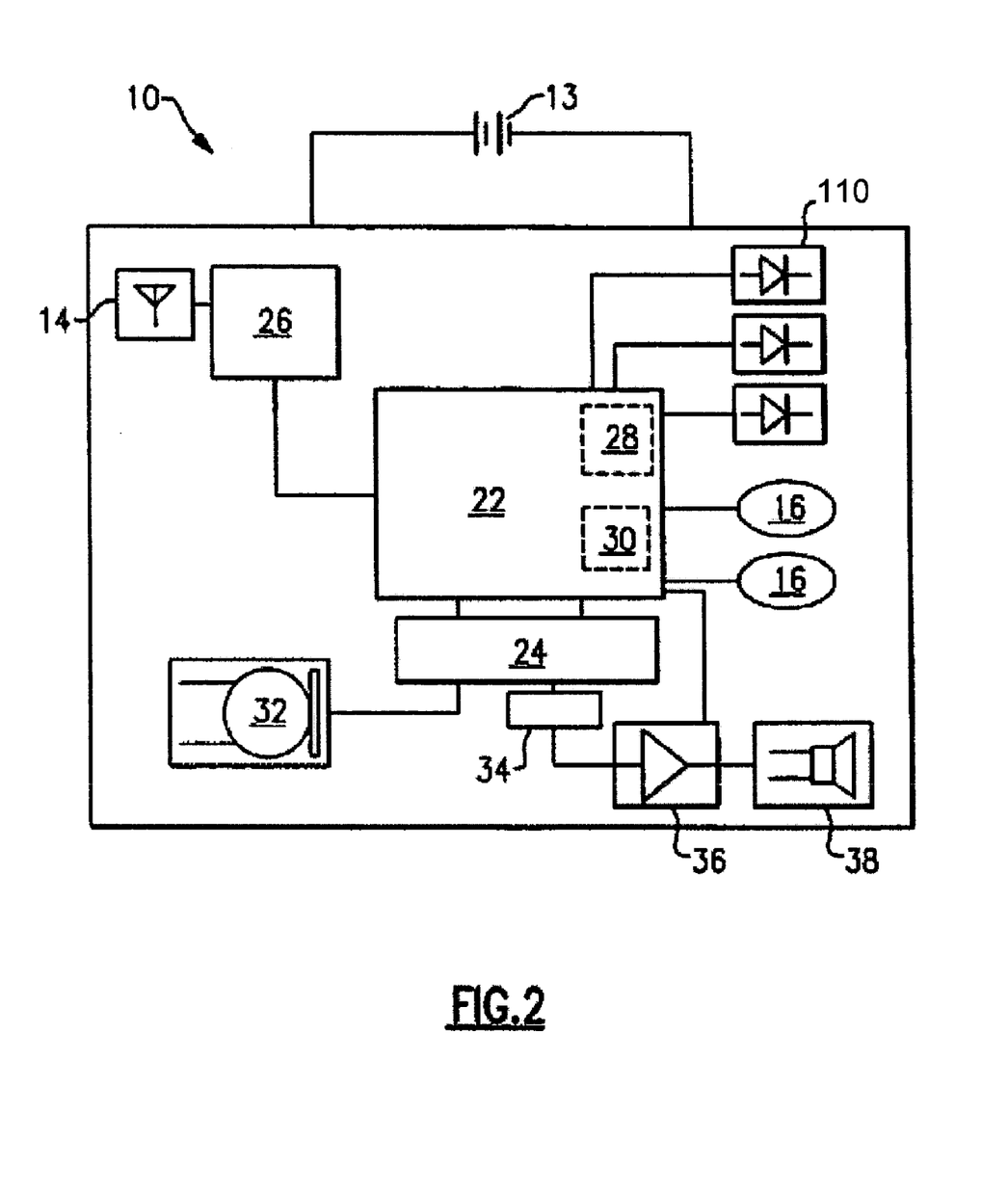
FIG. 2 is a schematic of circuitry for a wirefree intercom base unit according to the present invention.

Referring to FIG. 2, base unit 12 comprises a microcontroller 22 interconnected to a codec 24 for converting analog signals to digital signals (and vice versa) and interconnected to a digital radio transceiver 26 for transmitting and receiving digital signals. Microcontroller 22 is selected to be able to perform radio base-band functions, carry out compression and de-compression of digitized data, assemble digital data transmission signals, and disassemble received digital data signals. As will be explained in detail hereinafter, microcontroller 22 further includes a wake timer 28 and a talk timer 30 for controlling whether and when base unit 12 is in "sleep" mode, thereby conserving energy, or a "wake" mode, where microcontroller 22 periodically "sniffs" for incoming signals. It should be recognized that wake timer 28 and talk timer 30 may be implemented in separate hardware devices or by programming wake timer 28 and a talk timer 30 into microcontroller 22. Preferably, wake timer 28 of microcontroller 22 (and any other timers) comprises a watchdog style timer that may be operated while microcontroller 22 has otherwise been deactivated. Microcontroller 22 may comprise a low-power CMOS 8-bit microcontroller based on the AVR enhanced RISC architecture, such as an ATMEL Mega 88 available from the Atmel Corporation of San Jose, Calif.

Transceiver 26 is a conventional 915 MHz, multi-spectrum transceiver that is further associated with antenna 14 for transmitting and receiving digital radio signals. Transceiver 26 preferably supports about 125 radio channels, which may be chosen automatically or at the request of microcontroller 22, and wherein each channel allows for communications without interfering with other channels. Transceiver 26 should be capable of reliably transmitting to and from another intercom 10 at distances of up to 1000 feet. Transceiver 26 may comprise a low power, low-IF transceiver designed for operation in the license-free ISM bands at 433 MHz, 868 MHz and 915 MHz, such as an ADF 7020 available from Analog Devices, Inc. of Norwood, Mass.

Codec 24 is a conventional encoder-decoder for converting analog signals to digital code, and vice versa. Codec 24 may further compress the signals to conserve bandwidth. Codec 24 may comprise an ultra low-power codec including a microphone supply, preamplifier, 16-bit ADC, 16-bit DAC, serial audio interface, as well as power management and clock management for the ADC and the DAC. The sampling frequency of the ADC and of the DAC is preferably adjustable 4 kHz to 48 kHz. For example, codec 24 may comprise an XE3005 available from Semtech Corporation of Camarillo, Calif.

The analog to digital input portion of codec 24 is interconnected to a microphone 32 for receiving voice signals and creating electrical analog voice signals from captured sounds. Codec 24 encodes the analog voice signals into digital packets and provides the encoded digital packets to microcontroller 22. Microcontroller 22 buffers the digitized sound packets and applies compression algorithms, such as Adaptive Differential Pulse Code Modulation (ADPCM) or Delta Modulation, if desired, to reduce the packet size. An identification tag is also added to the packets, and they are sent by microcontroller to transceiver 26 for transmission to another base unit 12.

The digital to analog portion of codec 24 is interconnected to a filter 34 for conditioning outgoing analog signals and reducing noise. Filter 34 may comprise an operational amplifier and conventional low pass, high pass, or band pass filter.

Filter 34 is further interconnected to an amplifier 36 for improving the quality of signals in the sound spectrum at the lowest possible power consumption. Microcontroller 22 may be interconnected directly to amplifier 36 for supplying control signals that control the power consumption of amplifier 36. Amplifier 36 may comprise a conventional, off-the-shelf amplifier.

Amplifier 36 is connected to a speaker 38 for outputting audible sounds based on the amplified sound signals converted by codec 24 and processed by filter 34.

Packets of data containing digitized voice signals, as well as an appropriate ID information data string, that are received by transceiver of base unit 12 are transferred from transceiver 26 to microcontroller 22 for playback. Microcontroller 22 decompresses the data (if necessary) and sends the signals to codec 24. Codec 24 then converts the digital signals to analog sound signals, which are filtered by filter 34, amplified by amplifier 36, and output by speaker 38.

Figure 3:
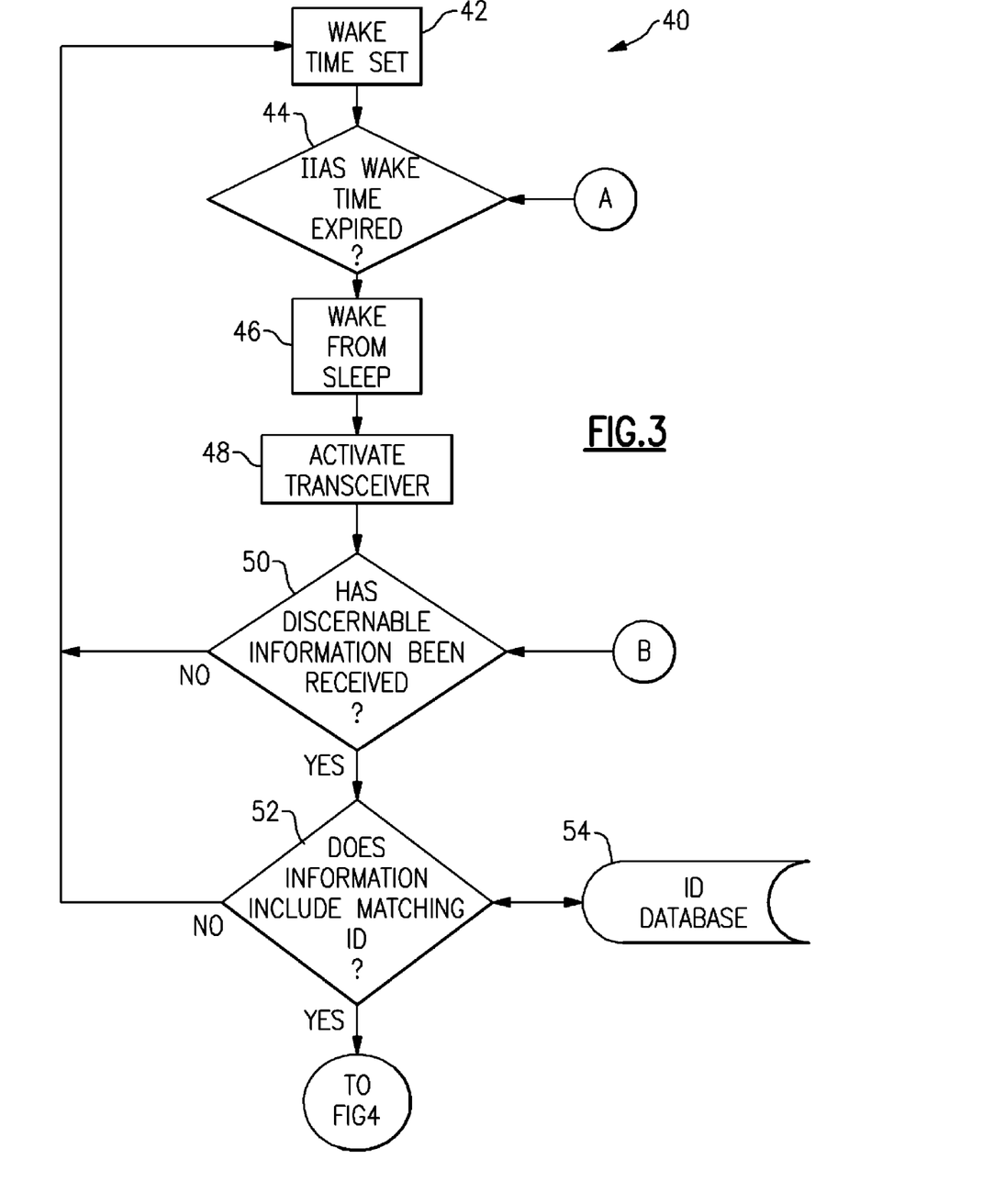
FIG. 3 is a flowchart of a control process for a wirefree intercom base unit according to the present invention.

The present invention reduces power consumption by engaging in a nearly complete shutdown of all circuitry for a predetermined period of time, which may be variable, depending on usage of intercom 10. Referring to FIG. 3, the basic power-saving "sniff" process 40 of the present invention commences with the setting 42 of wake timer 28, thereby placing intercom 10 in sleep mode. As a result, power consumption for unit 12 is reduced to the microamp range. When wake timer 28 expires 44, microcontroller 22 awakes from sleep mode 46, and "sniffs" for a signal by activating transceiver 26 for the receipt of signals 48. A check is then performed 50 to determine whether any information received by transceiver 26 is discernable. If so, the incoming ID byte is checked 52 against a reference database 54 to determine whether it matches a stored ID. If not, base unit 12 goes back to sleep at step 42, thereby conserving energy. If the ID matches, then microcontroller 22 awakens codec 24, and enters full function mode, as illustrated in FIG. 4.

Figure 4:
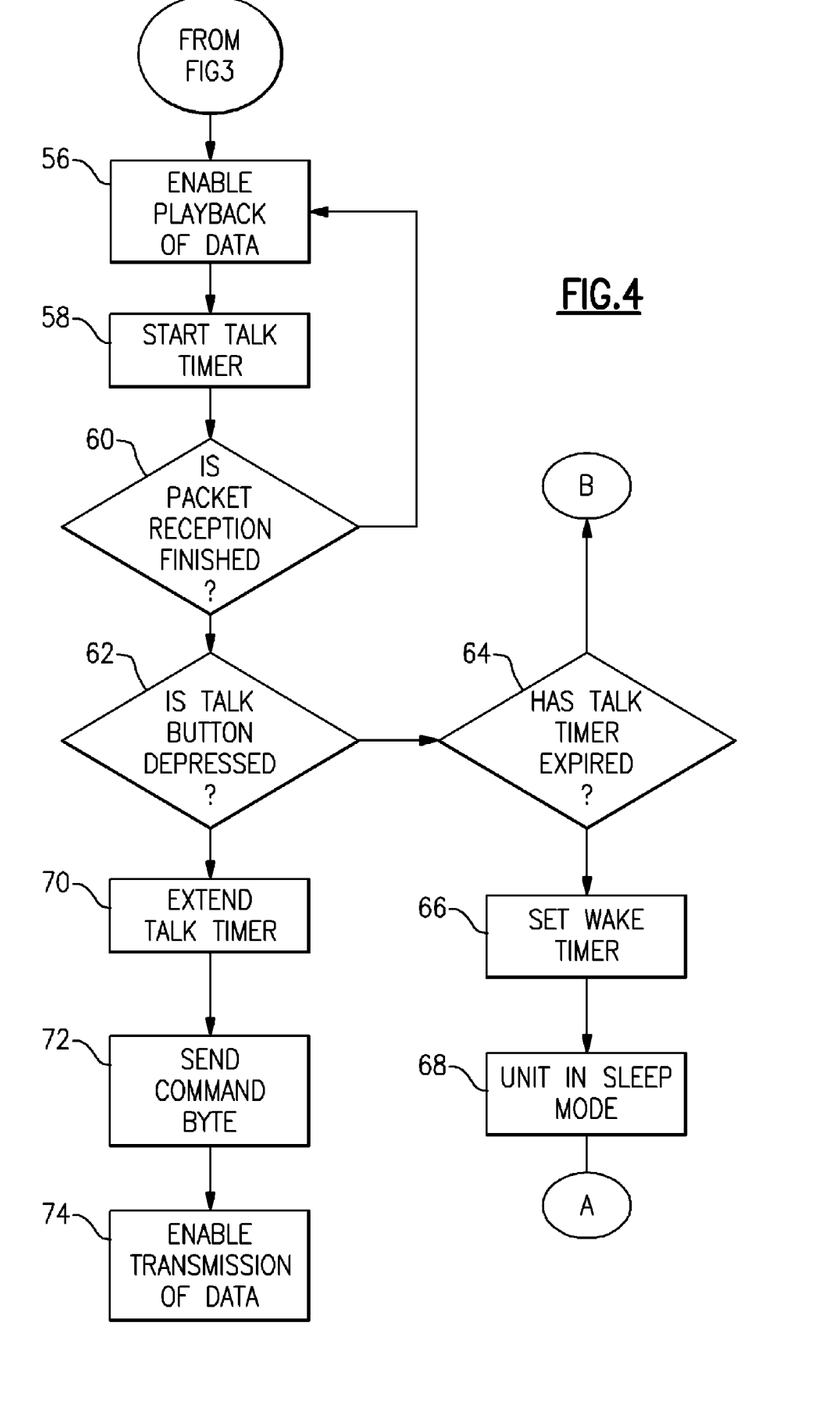
FIG. 4 is a continuation of the flowchart of FIG. 3 of a control process for a wirefree intercom base unit according to the present invention.

Referring to FIG. 4, if an ID is matched at step 52, playback of data is enabled 56. More specifically, codec 24 is enabled thereby starting packet reception, packet decompression, and error correction. Talk timer 30 is started 58, and a check is performed 60 to determine whether packet reception has finished. If not, control returns to step 56. If packet reception has finished at step 60, a check is performed to determine whether talk button 18 has been depressed 62. If talk button 18 has not been depressed, talk timer 30 is checked 64. If talk timer 30 has expired, wake timer 28 is set 66 and intercom 10 is sent into sleep mode 68. If talk timer 30 has not expired, control returns to step 50. If the talk button was depressed at step 62, talk timer 30 is extended 70 and a command byte is sent out 72 by transceiver 26 (to another intercom 10) to reverse the direction of communication. Transmission of data by intercom 10 is then enabled 74. More particularly, microcontroller 22 switches transceiver 26 from receive mode to send mode, sound is collected by microphone 32, and the resulting analog signals are converted by codec 24 into packet data. Microcontroller 22 compresses the packets, if desired, adds the appropriate ID, and assembles the data stream for transmission by transceiver 26 to another intercom 10.

Figure 5:
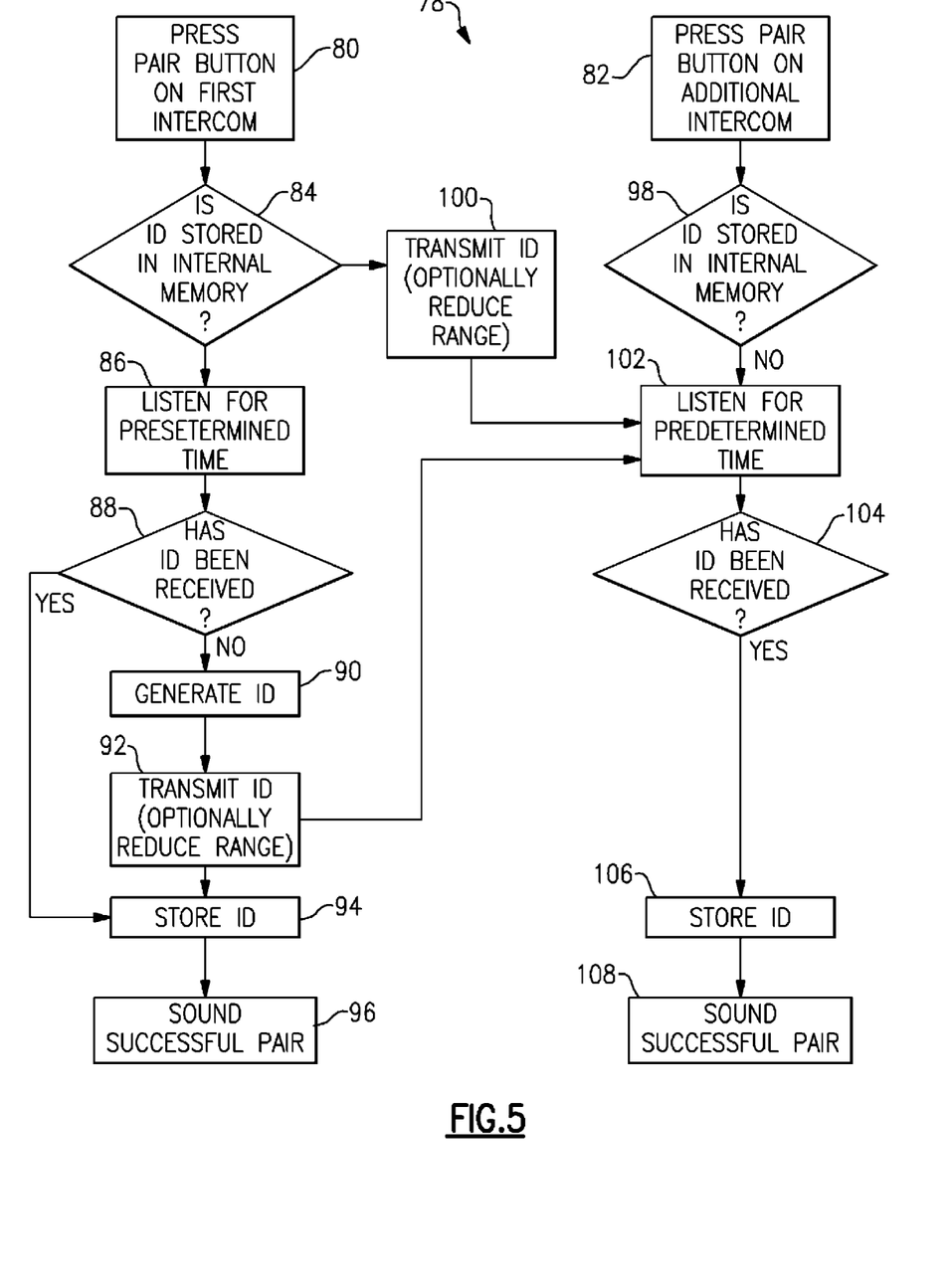
FIG. 5 is a flowchart of a pairing process for a wirefree intercom base unit according to the present invention.

Intercom 10 may further be provided with a "pair" button 76 for commencing a pairing process 78 by which two or more intercoms 10 are configured for transmission therebetween. Referring to FIG. 5, pairing of a first intercom 10 with a second intercom 10 (or any number of additional intercoms 10) may be accomplished through pairing process 78 programmed into each intercom 10. When a user wishes to pair two or more intercoms, the user presses 80 pair button 78 of first intercom 10. The user then depresses 82 pair button 78 of any additional intercoms 10. When pair button 78 is pressed, first intercom 10 checks internal memory 84 to determine whether an ID has been previously stored. If no ID has been previously stored 84, receiver 26 of first intercom 10 listens for a predetermined period of time 86, such as one second, and checks 88 to determine whether an ID has been received (from another intercom 10). If no ID is received from another intercom 10 at step 88, first intercom generates a random ID 90 and begins transmitting the ID 92 for a predetermined amount of time. Intercom 10 may optionally decrease its RF output level by 30 dbm, so that the "teach" range is reduced to the immediate area. Intercom 10 then stored the ID 94 and sounds a successful pair 96. If an ID has been sent by another intercom 10 and received at step 88, first intercom 10 stores the ID in non-volatile memory 94 and generates a success tone from speaker 96. After depressing pair button 76 of second intercom 10 at step 84, second intercom cycles through the same process 78 as first intercom, and checks whether an ID is stored in memory 98. If first intercom 10 has an ID stored in memory at step 84 and second intercom 10 does not, the ID of first intercom 10 is transmitted 100 to second intercom 10, which will be listening for a predetermined time 102. If first intercom 10 did not have an ID stored at step 84, any stored ID in second intercom 10 will be transmitted to first intercom 10 and received at step 88. If neither first nor second intercom 10 has an ID stored, the ID that is generated by first intercom 10 at step 90 and transmitted at step 92 will be received by second intercom 10 at step 102, checked by second intercom 10 at step, stored in memory 106, and a successful pair will be sounded 108.

The present invention further provides for multiple, secure conversations occurring simultaneously on intercom 10. As explained above, transceiver 26 supports multiple channels e.g., 125 channels. Preferably, a limited number, such as four, are dedicated for transmissions on intercom 10, which may be indicated by a series of LEDS 110 on intercom 10. Intercom 10 may further be configured to allow a user to select the specific channel to be used at all times, and may additionally be configured so that a user may choose to receive transmissions on "all channels" so that intercom 10 will receive and playback transmissions on any of the designated channels. Visual indication of the status may be reflected by cycling through four LEDs 110 as button 16 is depressed, to indicate transmissions on each of four particular channels for example, or lighting all LEDs when all channels have been selected. When a call is transmitted from an originating intercom 10, the sound is played back on all intercoms 10 set to receive the designated channel (or set to receive "all channels") and which have previously been "paired" to the originating intercom, i.e., the stored ID in all receiving intercoms 10 matches the ID of originating intercom 10.

Figure 6:
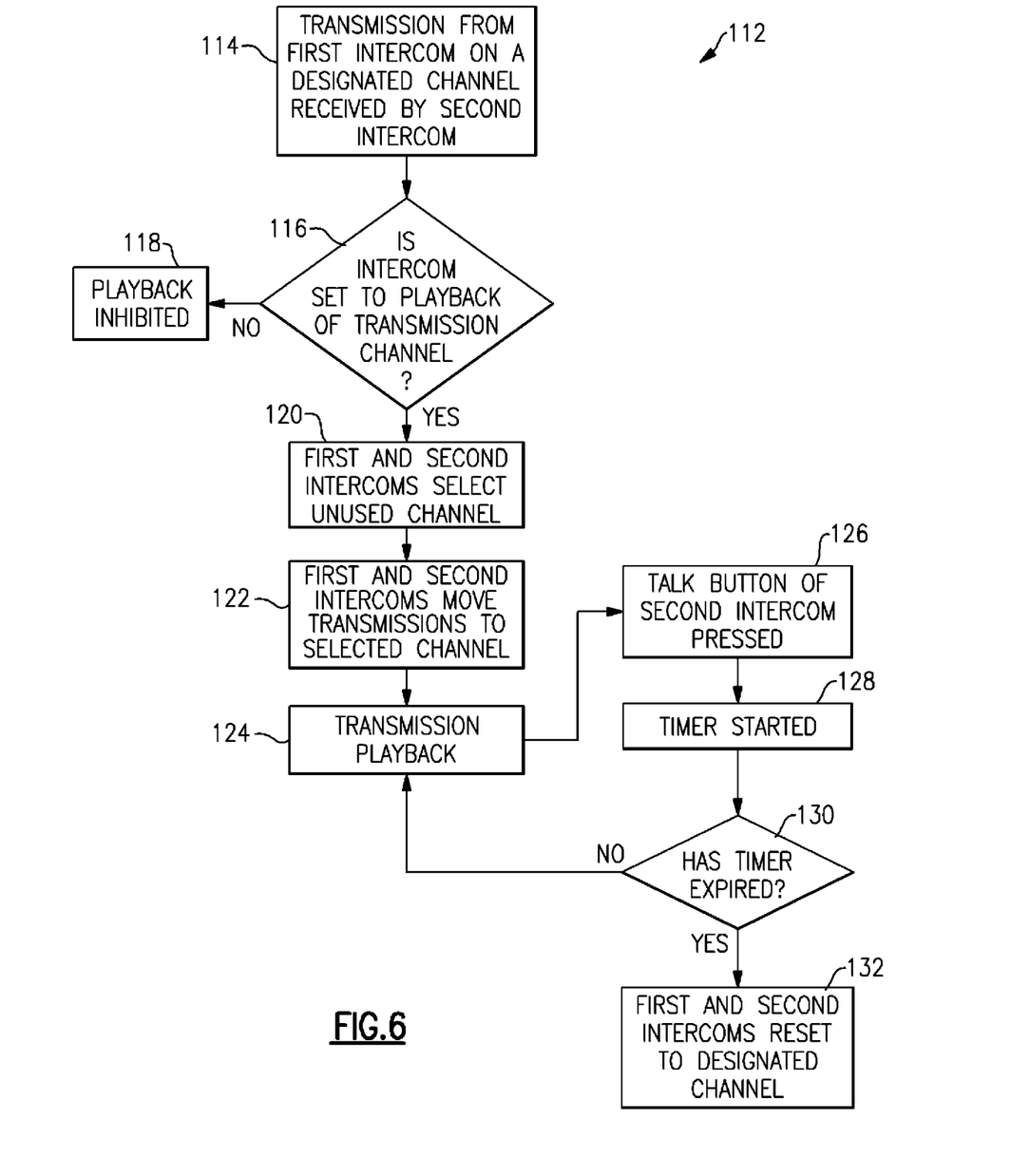
FIG. 6 is a flowchart of a security process for a wirefree intercom base unit according to the present invention.

Referring to FIG. 6, a security protocol process 112 for engaging in secure transmissions may begin when a transmission on a designated channel from a first intercom 10 is initially received 114 by a second intercom 10 (or any additional intercoms 10). The second intercom then checks 116 to determine whether it is set to playback the channel of the first intercom 10. If not, playback is inhibited 118. If the channel is confirmed at step 116, first and second intercoms select one of the non-designated channels 120 of transceiver 26. For example, first and second intercoms 10 may using the last three digits of the ID of first and second intercoms 10 to select one or more of the unused 125 channels. Selection of multiple channels allows first and second intercoms 10 to have a back-up channel in case of interference on the initially selected channel. Alternatively, first and second intercoms 10 may use other means to select an unused channel or channels, such as a random channel selection. Selection 120 concludes with first and second intercoms 10 exchanging the channel or channel set, and first and second intercoms 10 then move transmission to the selected channel or channels 122. The transmission may then be played back 124 on second intercom 10. A user of second intercom 10 may then depress talk button 18 to respond the initial transmission 126. A timer may started 128 (and reset) each time the user of second intercom 10 depresses talk button 18, and then checked for expiration 130 so that first and second intercoms are reset to the designated, non-secure channel or channels 132, as soon as transmissions conclude. Security process 112 allow other intercoms 10 to freely communicate on the designated channels without interfering with communications ongoing between first and second intercoms 10 on the secure channel or channels. Security process 112 may be provided as a default setting, and first and second intercoms 10 may be provided with a bypass switch 134 that allows a user to bypass security process 112 and remain in non-secure mode so that any other "paired" intercom 10 may playback the conversation. As two or more communicating intercoms 10 also provide the IDs created during pairing process 78 when they communicate, it is also possible that multiple set of intercoms 10, each set having a different ID, may communicate securely on a given channel with respect to any intercom 10 not programmed to playback communications including that ID even if set to receive signal on the given channel.

Figure 7:
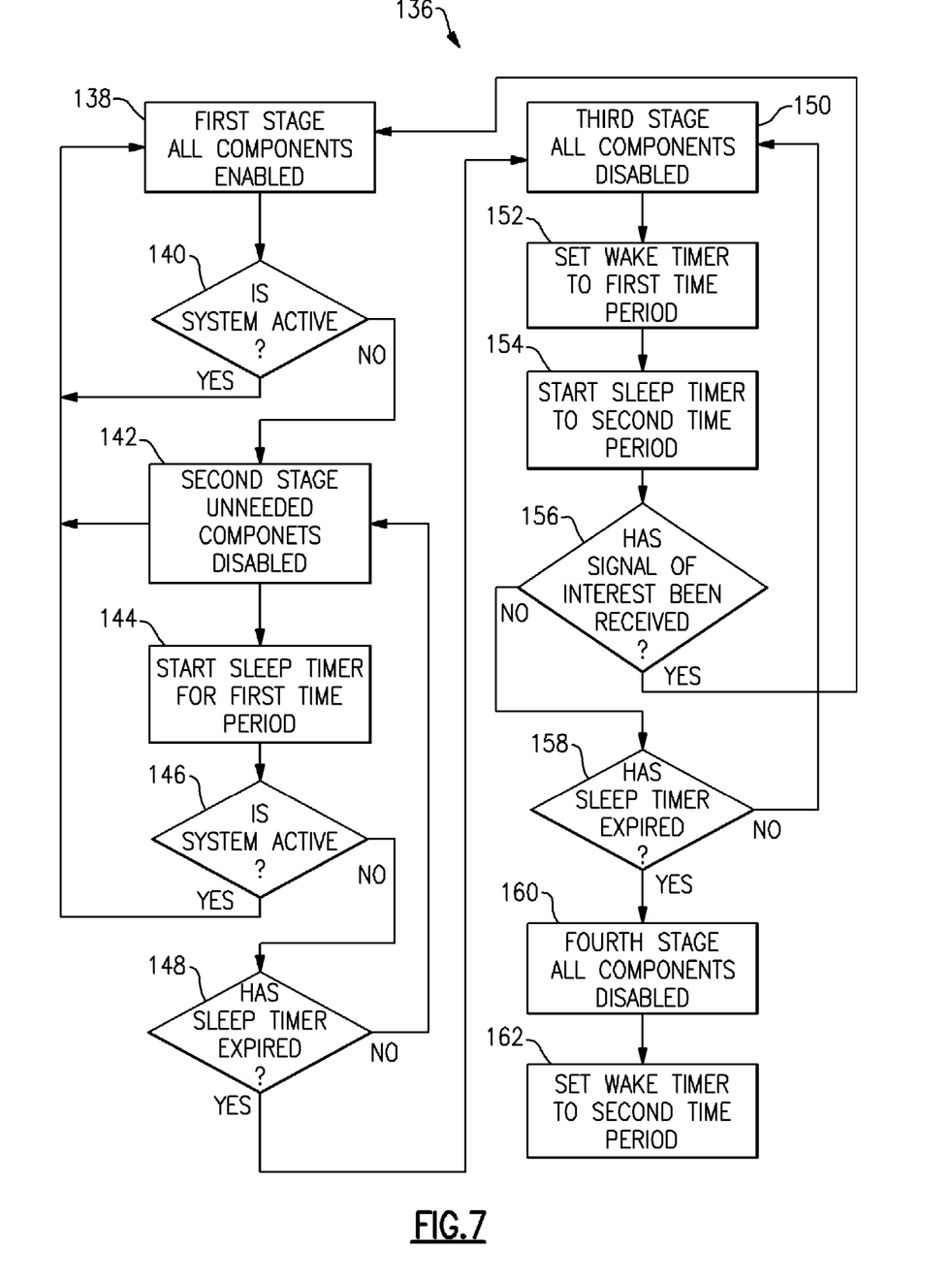
FIG. 7 is a flowchart of a power conservation process for a wirefree intercom base unit according to the present invention.

Referring to FIG. 7, microcontroller 22 may implement a multi-stage, power-saving sleep mode process 136, thereby substantially reducing power demand. In a first stage 138, intercom 10 is actively engaged in a connection, i.e., all components are enabled, intercom 10 is connected to another intercom 10, or intercom 10 is actively transmitting and receiving signals. A check is performed periodically 140 to verify that intercom 10 is active. If intercom 10 is inactive, intercom 10 is placed into a second, partial sleep stage where all unneeded components are disabled 142. For example, amplifier 36 and LEDs 110 may be powered down to conserve energy. However, transceiver 26 is kept on to verify whether other intercoms have also terminated the connection. In addition, a sleep timer is started to measure a first sleep period 144 that controls how long intercom 10 is in stage two 142. For example, sleep timer may be set for one hour. A check is then performed 146 to determine whether there is any system activity. If so, control returns to step 138. If no activity is detected, the sleep timer is checked for expiration 148. If the sleep timer has expired, intercom 10 enters a third sleep stage 150 where power is turned off to all components and wake timer 28 is set to measure a second time period 152. Wake timer 28 is preferably set for 500 milliseconds. The sleep timer is also started 154 to measure a second sleep period. Power saving process 136 then follows the basic "sniff" process, as illustrated in FIG. 3, every 500 milliseconds, i.e., a check is performed 156 to determine whether a signal of interest has been received. If no signal are detected at step 156, sleep timer is checked 158 to determine whether intercom 10 has been in third stage 150 for more than a predetermined time, such as four hours. If so, intercom 10 enters a final sleep stage 160, where all components are turned off and wake timer 28 is set 162 for a longer period of time that at step 152, such as two seconds. As illustrated in FIG. 3, microcontroller 22 executes the "sniff" process of FIG. 3 every two seconds, thereby further reducing power consumption while intercom 10 is in third stage 150. It should be recognized that multi-stage, power-saving sleep mode process 136 may be implemented in any digital transmitting and receiving device having a transceiver and microcontroller where reduced power consumption is advantageous. For example, process 136 could be implemented in a wireless security access system and even a wireless headset for a cellular or conventional telephone.

Figure 8A:
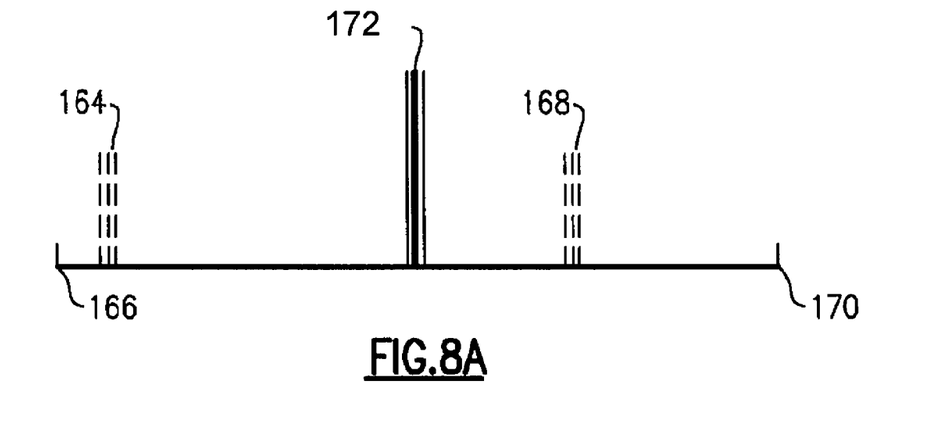
FIGS. 8A and 8B are schematics of interference in a dual channel system according to the present invention.
Figure 8B:
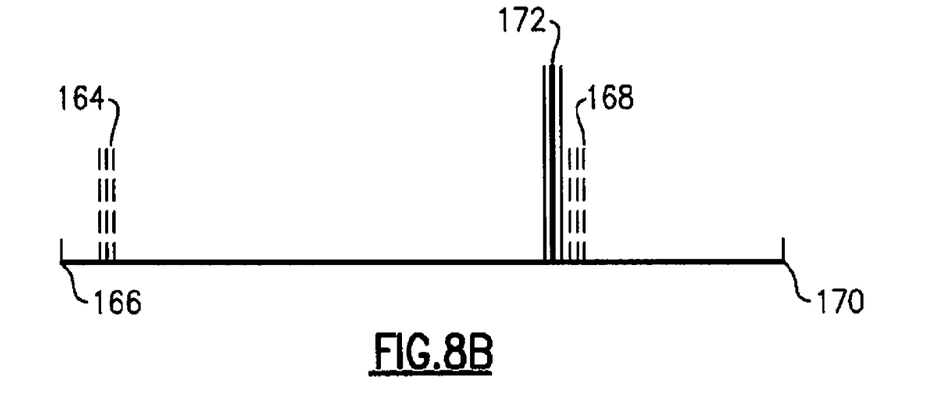

Microcontroller 22 may be programmed to improve the quality of analog playback from digitally transmitted signals. Interference may be reduced or eliminated by transmitting data transmitting data over a first channel and then immediately transmitting the data over a second, different channel, regardless of whether the receiving intercom request missing data. The second transmission may be used to repair or reconstruct any data lost or damaged in the first transmission. The first and second channels should be selected to reduce the likelihood that any interference in the transmission band of transceiver 26 will affect both channels. As seen in FIG. 8A, first channel 164 is selected to be above the minimum frequency 166 of transceiver 26, and a predetermined distance from second channel 168, which is less than the maximum frequency 170 of transceiver 26. In FIG. 8A, interference 172 is not affecting transmissions on either first channel 164 or second channel 166. In FIG. 8B, interference 172 is on or near second channel 166. First channel 164 is free from interference 172. Accordingly, any lost data in digital transmissions over second channel 166 could be repaired by the transmissions occurring over on first channel 164.

Microcontroller 22 may thus implement a sound quality improvement process 174 for increasing the clarity of transmissions between two or more paired intercoms 10. Transmission improvement process 174 commences with a valid transmission between two intercoms 176. Intercoms 10 then select the two channels for data transmission 178 (and the channel selection results are shared between intercoms 10). The first and second channels may chosen in advance by microcontroller 22 using a lookup table 180 containing a list of pairs of channel numbers. Microcontroller 22 may automatically select the channel pair, or the channel pairs may be factory installed and selected by a dipswitch. Automatic selection of the channel pair can be achieved by generating a random number in microcontroller 22 and then using the number to select the channel pair from look-up table 166. Alternatively, the channel pair could be selected by using the security ID generated or stored by intercom 10 to select a channel set. Table 1 below contains a list of 10 sets of channel pairs that may be selected by microcontroller 22 in the 902-937 Mhz band, with 3 Mhz channel spacing.

TABLE 1

| Channel Set No. | 1st channel | 2nd channel |
|---|---|---|
| 1 | 902 | 910 |
| 2 | 905 | 913 |
| 3 | 908 | 916 |
| 4 | 911 | 919 |
| 5 | 914 | 922 |
| 6 | 917 | 925 |
| 7 | 920 | 928 |
| 8 | 923 | 931 |
| 9 | 926 | 934 |
| 10 | 929 | 937 |

Figure 9:
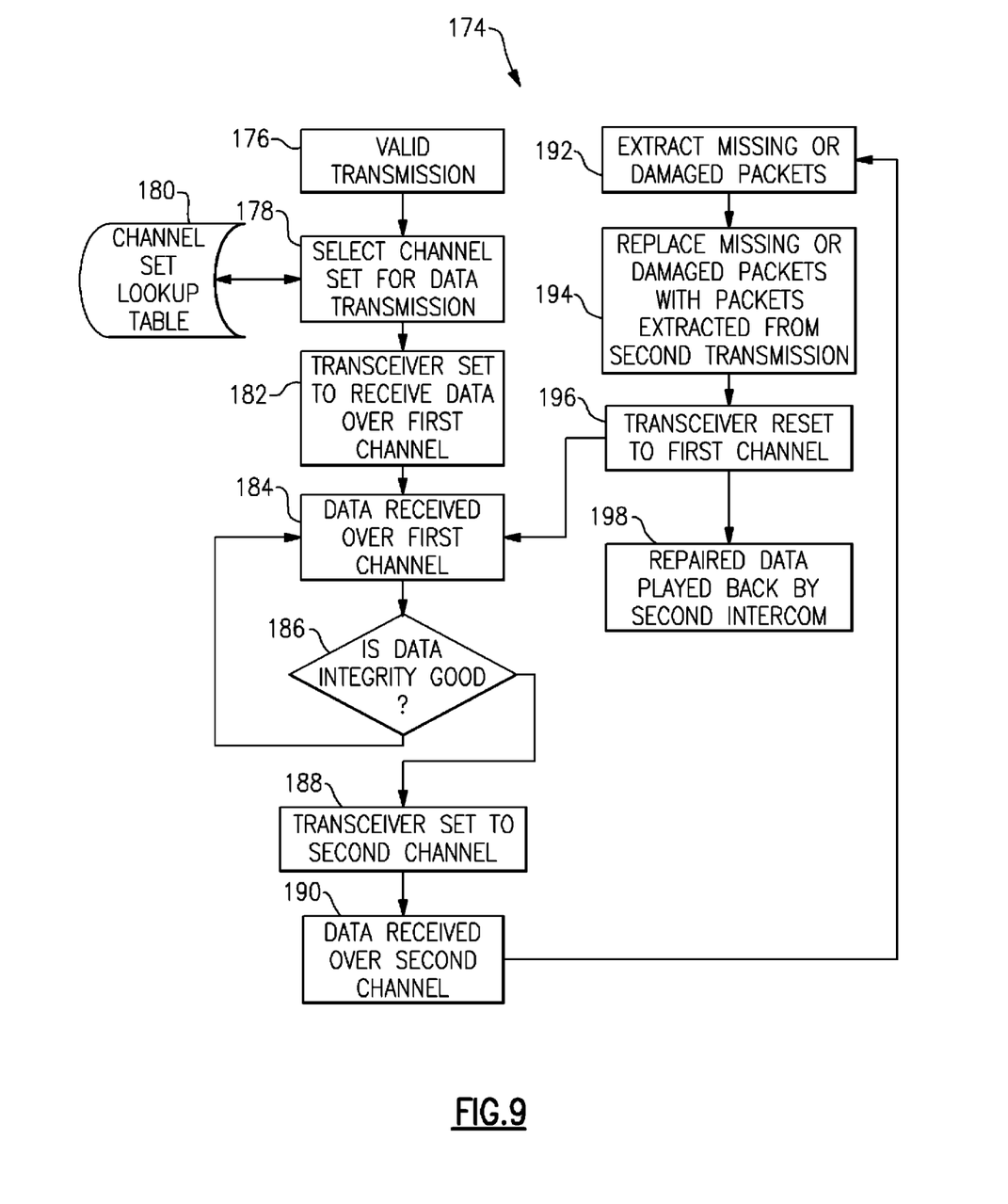
FIG. 9 is flowchart of a digital signal restoration process for a wirefree intercom base unit according to the present invention.

With reference to FIG. 9, once the channels are selected and shared 178, transceivers 26 of intercoms 10 are set 182 to transmit and receive on the designated channel set. When data is received over the first channel 184, microcontroller 22 checks the data integrity 186. If data is good at step 186, more data may be received at step 184. If the data is damaged, transceiver 26 is set to the second channel 188 so that intercom 10 may receive the redundant transmission of data sent over the second channel 190. The missing or damaged data packets received in the first transmission at step 184 are then extracted 192 from the data received in the second transmission over second channel at step 190. The extracted packets are then assembled 194 with the data received at step 184 to form an error data stream. Transceiver 26 is reset back to the first channel 196 (so that more data may be received at step 184), and the repaired data from step 194 is played back 198 by the receiving intercom 10. In this manner, the sound quality of transmitted signals is improved by repairing or replacing data that would have been otherwise lost in transmission. It should be recognized that sound quality improvement process 174 may be implemented in any digital transmitting and receiving device having a digital transceiver and associated microcontroller where reduced power consumption is advantageous. For example, process 174 could be implemented in a wireless security access system, a digital walkie-talkie system, or even in a wireless headset for a cellular or conventional telephone.

What is claimed is:

1. A digital communication device, comprising:
   a digital transceiver;
   a microcontroller interconnected to said transceiver, wherein said microcontroller is programmed to
      receive a first transmission including digital data over a primary channel;
      receive a second transmission of said digital data over a secondary channel, the second transmission comprising a transmission of the digital data in the first transmission;
      review said first transmission for errors in said digital data;
      switch to the secondary channel if said first transmission includes errors in said digital data; and
      correct said errors in said digital data of said first transmission by extracting missing or damaged packets from the first transmission and replacing the missing or damaged packets using digital data extracted from said second transmission.

2. The device of claim 1, wherein said microcontroller is further programmed to switch back to said primary channel after correcting said errors in said digital data of said first transmission using said data in said second transmission.

3. The device of claim 2, further including a database interconnected to said microcontroller and having at least one predetermined channel set.

4. The device of claim 3, wherein each channel set includes a first channel and a second channel.

5. The device of claim 4, wherein said microcontroller selects said primary channel and said secondary channel by looking up said channel set in said database.

6. The device of claim 5, wherein said first channel of said channel set is selected by said microcontroller to be said primary channel and said second channel of said channel set is selected by said microcontroller to be said secondary channel.

7. The device of claim 6, wherein said first channel and said second channel are spaced apart by eight megahertz or more.

8. A method of improving the quality of transmissions in a digital communication device including a digital transceiver and a microcontroller interconnected to said digital transceiver, said method comprising:

selecting a primary channel for receiving a first transmission including digital data;

receiving said first transmission including said digital data;

checking said first transmission for errors in said digital data;

switching to a secondary channel if said digital data includes any errors;

receiving a second transmission of said digital data on said secondary channel, the second transmission comprising a transmission of the digital data in the first transmission; and correcting said digital data in said first transmission by extracting missing or damaged packets from the first transmission and replacing the missing or damaged packets with digital data extracted from said second transmission.

9. The method of claim 8, further comprising the step of switching back to said primary channel after correcting said digital data.

10. The method of claim 9, wherein the step of selecting a primary channel for receiving a first transmission including digital data comprises the steps of:

retrieving a channel set including a first channel and a second channel from a database interconnected to said microcontroller; and setting said first channel as said primary channel and said second channel as said secondary channel.

11. The method of claim 10, wherein the first channel and the second channel are spaced apart by a predetermined distance.

12. The method of claim 11, wherein the predetermined distance is at least eight megahertz.

13. The method of claim 12, wherein the step of retrieving a channel set including a first channel and a second channel from a database interconnected to said microcontroller further comprises the steps generating a random number and then selecting said channel set from a list of said channels sets using said random number.

14. The method of claim 13, wherein said list of channel sets includes a plurality of first and second channels spaced apart by three megahertz increments.

15. The method of claim 12, wherein the step of retrieving a channel set including a first channel and a second channel from a database interconnected to said microcontroller comprises the step of selecting said channel set from a list of said channel sets according to a predetermined pattern.

16. A digital communication system, comprising:

a first intercom including a first microcontroller interconnected to a first digital transceiver;

a second intercom including a second microcontroller interconnected to a second digital transceiver;

wherein said first and second microcontrollers are programmed to select a primary channel for exchanging transmissions including digital data, to cause first transmissions of said digital data over said primary channel, check said transmissions for errors, to cause second transmissions including said digital data over a secondary channel, and to correct said errors in said digital data received over said primary channel by extracting missing or damaged packets from the digital data received over said primary channel and replacing the missing or damaged packets using digital data extracted from said second transmissions over said secondary channel.

17. The system of claim 16, further comprising a first database interconnected to said first microcontroller and including a first lookup table and a second database interconnected to said second microcontroller and including a second lookup table.

18. The system of claim 17, wherein said first and second microcontrollers are programmed to select said primary and secondary channels using said first and second lookup tables.

19. The system of claim 18, further comprising a first codec interconnected to said first microcontroller and a second codec interconnected to said second microcontroller.

20. The system of claim 19, further comprising a first speaker interconnected to said first codec and a second speaker interconnected to said second codec.

* * * * *